(12) United States Patent
Ueda

(10) Patent No.: US 9,044,995 B2
(45) Date of Patent: Jun. 2, 2015

(54) REFLECTION FRAME-EQUIPPED SHEET

(75) Inventor: Jun Ueda, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 14/002,163

(22) PCT Filed: Jan. 16, 2012

(86) PCT No.: PCT/JP2012/050694
§ 371 (c)(1),
(2), (4) Date: Aug. 29, 2013

(87) PCT Pub. No.: WO2013/046730
PCT Pub. Date: Apr. 4, 2013

(65) Prior Publication Data
US 2013/0337198 A1     Dec. 19, 2013

(30) Foreign Application Priority Data

Sep. 30, 2011 (JP) ................. 2011-218054

(51) Int. Cl.
*B43L 1/08* (2006.01)
*G06F 3/042* (2006.01)
*G03B 21/58* (2014.01)
*B43L 1/04* (2006.01)
*B43L 1/00* (2006.01)

(52) U.S. Cl.
CPC ... *B43L 1/08* (2013.01); *B43L 1/04* (2013.01); *G06F 3/0428* (2013.01); *B43L 1/00* (2013.01); *B43L 1/004* (2013.01); *G03B 21/58* (2013.01)

(58) Field of Classification Search
CPC .............. B43L 1/08; B43L 1/04; B43L 1/00; B43L 1/004; G06F 3/0428; G03B 21/58
USPC ...................... 359/443, 461; 353/65
See application file for complete search history.

(56) References Cited

U.S. PATENT DOCUMENTS

| | | | | |
|---|---|---|---|---|
| 4,846,694 | A  * | 7/1989 | Erhardt | 434/365 |
| 5,489,923 | A  * | 2/1996 | Marshall et al. | 345/156 |
| 5,764,385 | A  * | 6/1998 | Ohyama | 358/498 |
| 6,046,845 | A  * | 4/2000 | Niwa et al. | 359/443 |
| 6,335,724 | B1 | 1/2002 | Takekawa et al. | |
| 6,466,369 | B1 * | 10/2002 | Maddock | 359/460 |
| 6,504,532 | B1 | 1/2003 | Ogasahara et al. | |
| 7,589,898 | B2 * | 9/2009 | Shigemura et al. | 359/619 |
| 7,626,577 | B2 * | 12/2009 | Martin | 345/173 |
| 2002/0050985 | A1 | 5/2002 | Takekawa et al. | |
| 2002/0118151 | A1* | 8/2002 | Chen | 345/84 |
| 2002/0162949 | A1 | 11/2002 | Iwamoto et al. | |
| 2007/0089915 | A1* | 4/2007 | Ogawa et al. | 178/18.09 |
| 2012/0065929 | A1* | 3/2012 | Yoshimura | 702/150 |
| 2012/0068974 | A1* | 3/2012 | Ogawa | 345/175 |
| 2013/0057466 | A1* | 3/2013 | Kawasaki | 345/156 |

(Continued)

FOREIGN PATENT DOCUMENTS

| | | | | |
|---|---|---|---|---|
| JP | 05198607 A | * | 8/1993 | ............ H01L 21/56 |
| JP | 2000-222132 A | | 8/2000 | |
| JP | 2002-132435 A | | 5/2002 | |
| JP | 3931030 B2 | | 3/2007 | |
| JP | 3986710 B2 | | 7/2007 | |

(Continued)

*Primary Examiner* — Christopher Mahoney
(74) *Attorney, Agent, or Firm* — Mattingly & Malur, PC

(57) ABSTRACT

An interactive whiteboard system that can be put on a desk or a floor surface is implemented. A reflection frame-equipped sheet in accordance with the present invention has a flexible sheet, and a retroreflective frame(s) that is/are fixed to given one side or given two opposite sides of the sheet.

8 Claims, 14 Drawing Sheets

(56) References Cited

U.S. PATENT DOCUMENTS

2013/0099675 A1* 4/2013 Ma et al. .................. 315/152
2013/0155029 A1* 6/2013 Morrison et al. ........... 345/175

FOREIGN PATENT DOCUMENTS

| JP | 2009-238167 A | 10/2009 |
| WO | 01/57635 A1 | 8/2001 |

* cited by examiner

Fig. 3
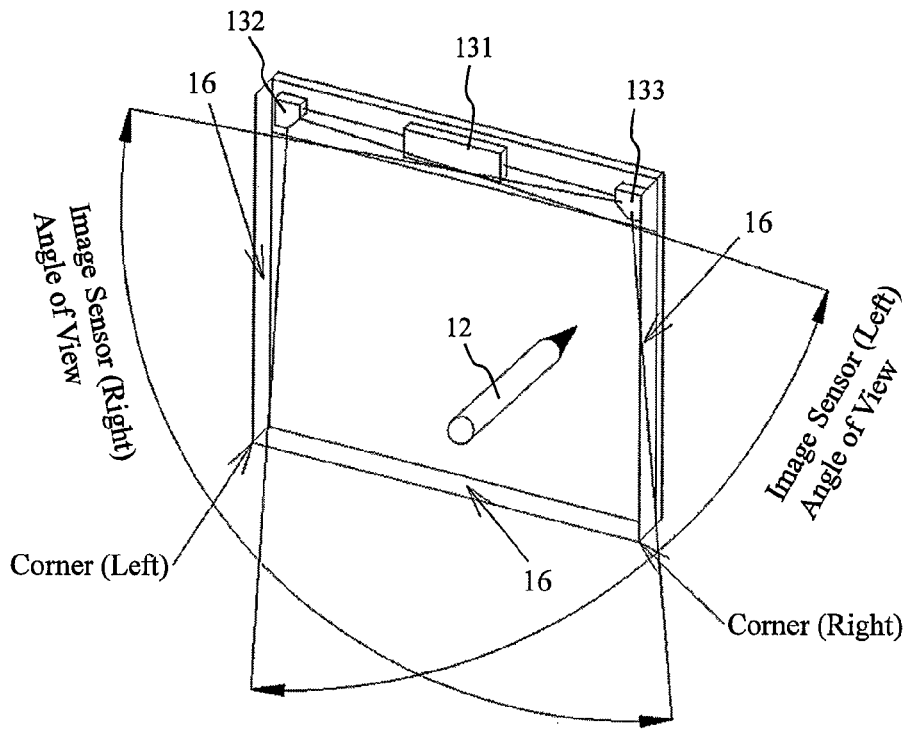
Image Sensor (Right) Captured Image
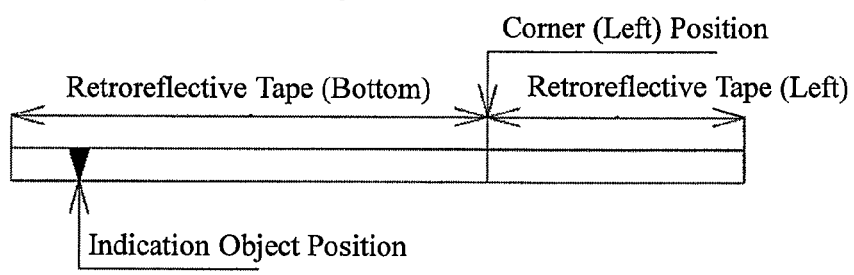
Image Sensor (Left) Captured Image
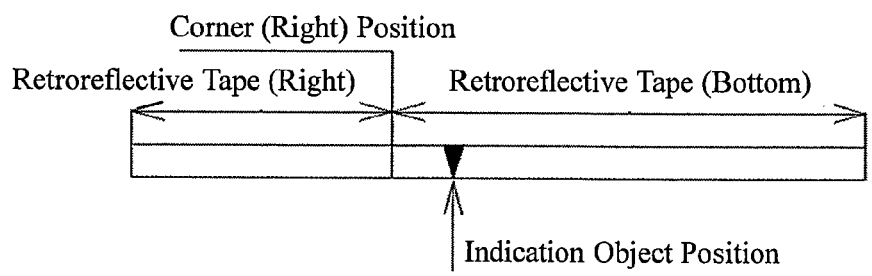

Fig. 4
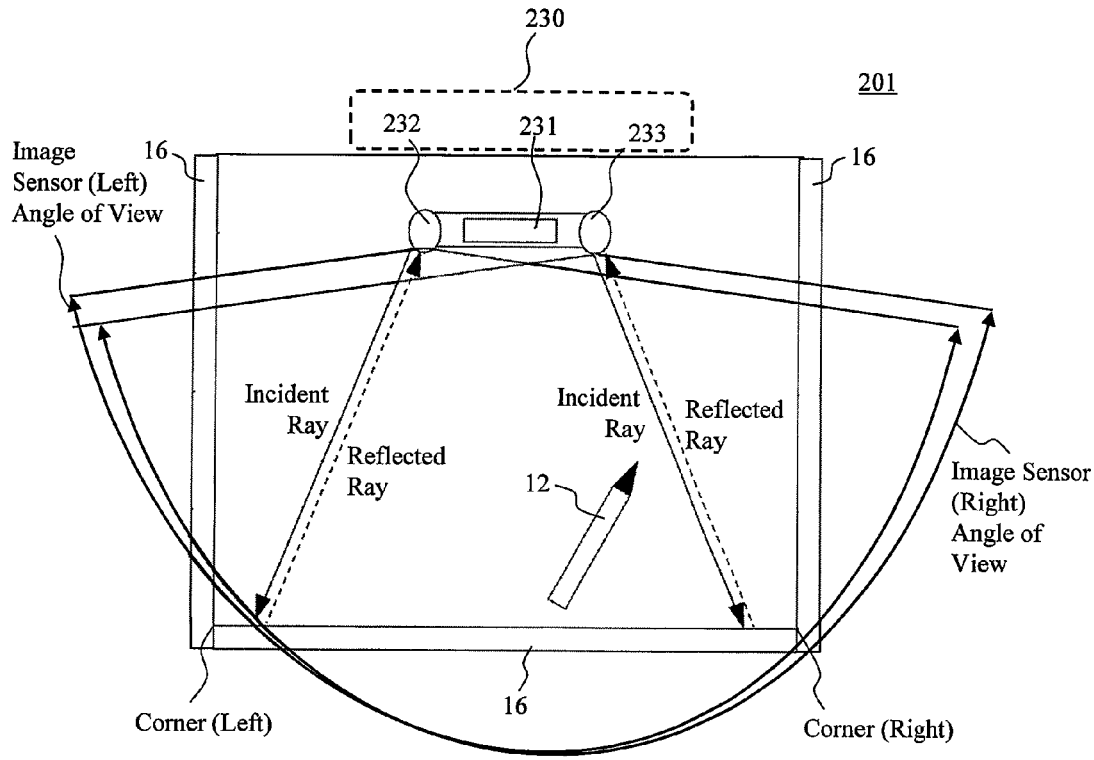
Image Sensor (Right) Captured Image
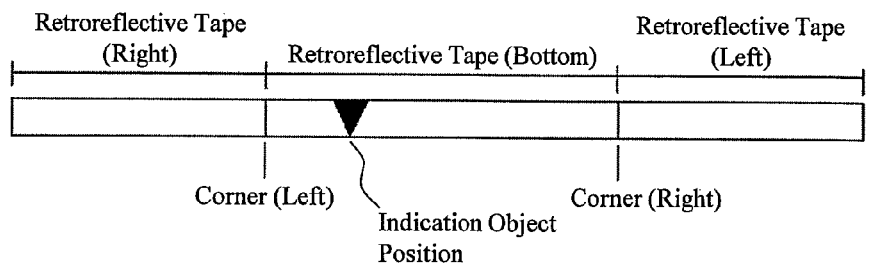
Image Sensor (Left) Captured Image
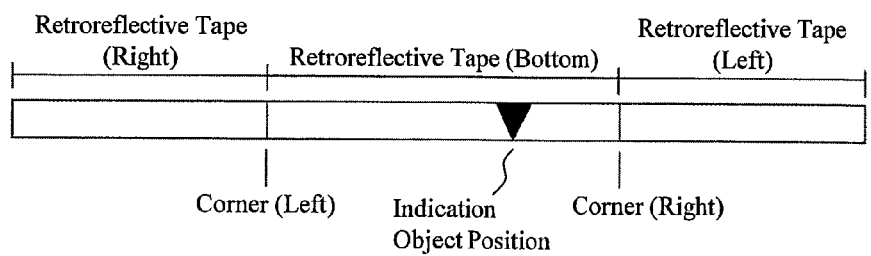

REFLECTION FRAME-EQUIPPED SHEET

TECHNICAL FIELD

The present invention relates to a reflection frame-equipped sheet that is used as an operation screen and a retroreflective plate of an interactive whiteboard (IWB).

BACKGROUND ART

In recent years, interactive whiteboards for which fingers, electronic pens, and the like are used as input means have come into widespread use. Interactive whiteboards can electronically realize operability that is similar to the operability for when something is written on a blackboard with chalk. An interactive whiteboard includes a coordinate input device and a display device. In addition, the coordinate input device includes a position detection device that detects the position of an operation input by an input means, and an arithmetic unit that processes information on the position.

For the display device, a PDP (Plasma Display Panel), a LCD (Liquid Crystal Display), a projector, or the like is used. For the position detection device, tablet or touch-screen detection devices have started to come into widespread use. As a technology for realizing this, various technologies such as an electromagnetic induction method and an ultrasonic method have been put into practical use.

Besides, among position detection devices, there is also known an optical detection device that captures an image of an area around a display screen (hereinafter also referred to as an "operation input screen") using an image sensor, and detects the position of an input object that has passed transversely across the operation input screen through signal processing on the captured image (see Patent Literature 1 and 2). The optical detection devices have been increasingly used year by year due to their advantages in high response to drawing, high tolerance to external noise such as infrared rays, sunlight, and changes in the temperature, and the like.

The optical position detection device includes image sensors, a control board for processing images acquired by the image sensors, and light sources, and such components are arranged around an operation input screen. For the optical position detection device, two or more image sensors are arranged around the operation input screen. This is in order to detect an input object that has passed transversely across the operation input screen or a shadow thereof from a plurality of visual fields, and detect the input coordinates in accordance with the principle of the triangulation.

A plurality of light sources that emit light rays such as LEDs (Light Emitting Diodes) are arranged around the image sensor. The light sources are mounted substantially in parallel with the operation input screen so that they irradiate a reflective plane with retroreflective ability that is arranged in a manner surrounding the operation input screen. Usually, for a reflective plane with retroreflective ability, a retroreflective tape is used that has minute corner cube retroreflectors and the like uniformly arranged thereon. The retroreflective tape can reflect a light ray back in the direction of a light source independently of the incident angle of the light ray. Hereinafter, a frame that has a retroreflective tape attached thereto along at least one side thereof will be referred to as a retroreflective frame.

That is, an optical position detection device adopts a structure in which a light ray is shone along an optical input screen, and a reflected ray that is reflected back by a retroreflective tape is received (captured) by image sensors. Therefore, when an input object has been brought into proximity with the operation input screen has passed transversely across the operation input screen (i.e., has blocked the light ray), a shadow appears on the captured image. The optical position detection device provides a control board with a position on the shadow detected by the plurality of image sensors, so that the coordinates of the input object that has passed transversely across the operation input screen are calculated.

CITATION LIST

Patent Literature

Patent Literature 1: JP 3931030 B
Patent Literature 2: JP 3986710 B

SUMMARY OF INVENTION

Technical Problem

By the way, a conventional interactive whiteboard is based on the presumption that an operation input screen is put perpendicularly with respect to a floor surface, and is not based on the presumption that it is put on a desk or a floor surface. Further, in applications where a desk or a floor surface is used as an interactive whiteboard, it is considered that an interactive whiteboard that can be easily carried about and stored is demanded.

Solution to Problem

Therefore, the inventor proposes a reflection frame-equipped sheet having a flexible sheet and a retroreflective frame(s) that is/are fixed to one side or two opposite sides of the flexible sheet. In one invention, for a retroreflective frame(s) that is/are fixed to one side or two opposite sides of a flexible sheet, a removable retroreflective frame(s) is/are prepared that is/are attached to another side or the other two sides. In another proposed invention, to a retroreflective frame(s) that is/are fixed to one side or two opposite sides of a flexible sheet, at least one retroreflective frame is attached that can be opened/closed along a surface of the sheet.

Advantageous Effects of Invention

According to the present invention, a flexible sheet can be deformed such that it is wound around a retroreflective frame or folded in two, and thus can be made compact. Other problems, structures, and advantageous effects will become apparent from the following description.

BRIEF DESCRIPTION OF DRAWINGS

FIG. 3 is a view showing an example of the angles of view of image sensors (conventional);

FIG. 4 is a view showing another example of the angles of view of image sensors (embodiment);

DESCRIPTION OF EMBODIMENTS

Figure 1:
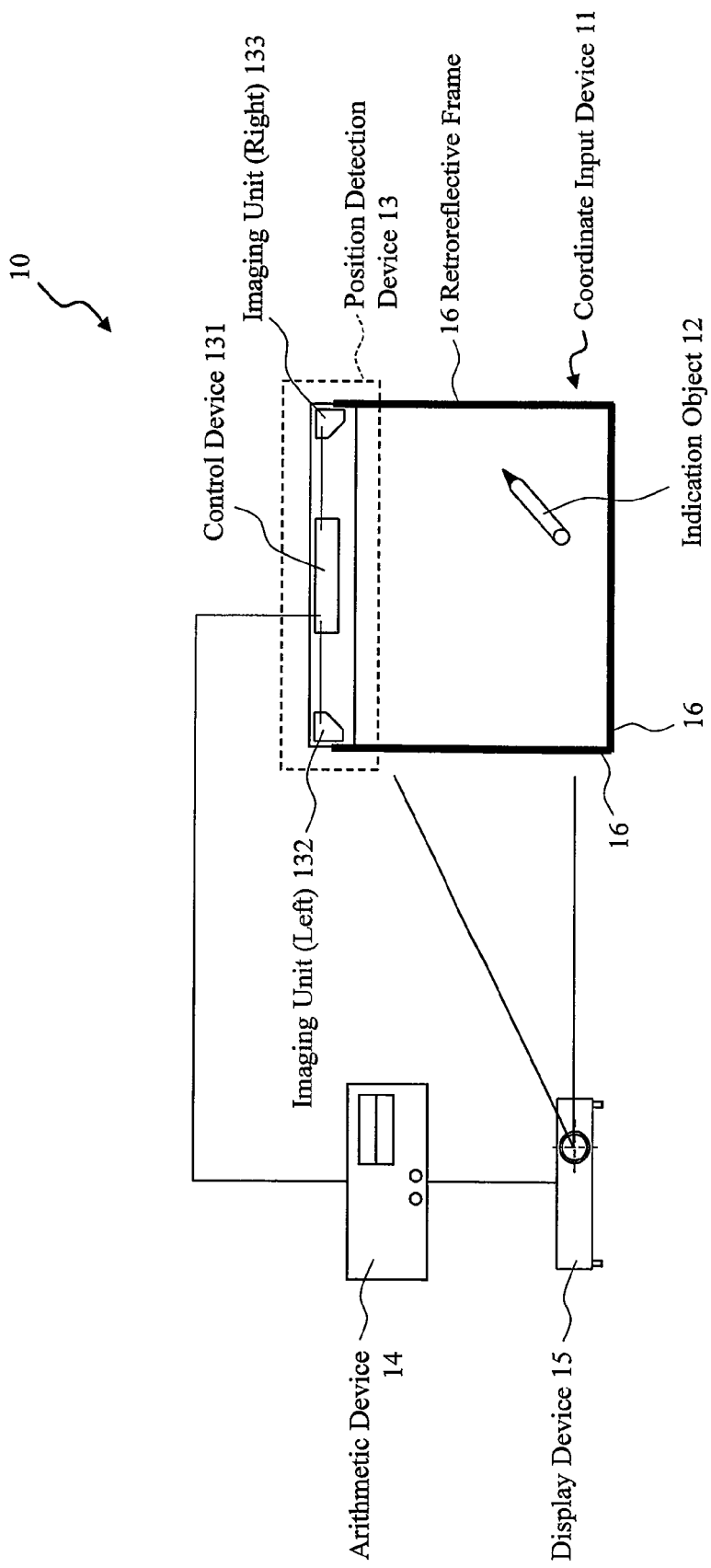
FIG. 1 is a view showing the schematic structure of an image-sensor-type interactive whiteboard system (conventional)

In the following embodiment, description will be made with the embodiment divided into a plurality of sections or embodiments if necessary. In the following embodiment, when the number of elements and the like (which include the number, numerical value, quantity, range, and the like) are referred to, such a number is not limited to a particular number and may be more than or less than the particular number unless otherwise specified or unless it is obvious that the number is limited to such a particular number in principle.

Further, in the following embodiment, when the shapes, positional relationship, and the like of components and the like are referred to, it is appreciated that such components include those that are substantially similar or close in shape to the components unless otherwise specified or unless it is obvious that the other components are not similar or close in shape to the components of the embodiment.

Hereinafter, the embodiment of the present invention will be specifically described on the basis of the drawings. It should be noted that members having an identical function are denoted by an identical or related reference numeral throughout all the drawings for illustrating the embodiment, and repeated explanation thereof will be omitted. In addition, in the following embodiment, description of identical or similar portions will not be repeated in principle unless it is necessary to do so.

[Conventional Structure of Interactive Whiteboard System]

First, the overall structure of an interactive whiteboard system will be described. Hereinafter, a conventional interactive whiteboard system will be described first to clarify the difference between an interactive whiteboard system in accordance with the embodiment and the conventional interactive whiteboard system.

FIG. 1 shows an overview of a conventional interactive whiteboard system that uses an optical position detection device. An interactive whiteboard system 10 shown in FIG. 1 includes a coordinate input device 11, an indication object 12, an arithmetic unit 14, and a display device 15.

The coordinate input device 11 includes a position detection device 13 as a signal processing unit and a retroreflective frame 16 as a structural body. Each of the position detection device 13 and the retroreflective frame 16 is attached to a frame body (not shown). In addition, the retroreflective frame 16 is arranged in a manner surrounding the outer edges of the right side, the left side, and the bottom side of an operation input screen. A plane, which is perpendicular to the operation input screen, of the retroreflective frame 16 has a retroreflective tape attached thereto. A surface of the retroreflective tape has minute corner cubes or spherical beads formed thereon.

The position detection device 13 includes a control device 131, an imaging unit (left) 132, and an imaging unit (right) 133. The imaging unit 132 includes an image sensor and a light source. The angle of view of the imaging unit 132 is about 90 degrees, and the imaging unit 132 images the retroreflective tape arranged on the right side and the bottom side of the operation input screen. The angle of view of the other imaging unit (right) 133 is also about 90 degrees, and the imaging unit 133 images the retroreflective tape arranged on the left side and the bottom side of the operation input screen. Note that the light source (not shown) arranged around the image sensor emits an infrared ray in the same range as the imaging range of the corresponding imaging unit 132 or 133.

As described previously, an infrared ray that is incident on the retroreflective tape is reflected in the direction of a light source regardless of the incident angle of the infrared ray. Therefore, the image sensors of the imaging units 132 and 133 receive the infrared ray reflected by the retroreflective tape. Thus, when an indication object 12, which has passed transversely across the operation input screen formed through incidence of an infrared ray and a reflection path thereof, is absent, the image sensors of the imaging units 132 and 133 image the surface of the retroreflective tape in the imaging range as it is. Meanwhile, when the indication object 12 such as a finger or a bar has passed transversely across the operation input screen, the object is imaged as a shadow on the imaging screen by the image sensors of the imaging units 132 and 133. It should be noted that examples of the indication object 12 also include an electronic pen with a wireless communication function.

The control device 131, upon receipt of the captured images from the imaging units 132 and 133, determines the position information on the shadow, and computes from the position information the coordinates (X,Y) of the indication object 12 on the operation input screen on the basis of the principle of the triangulation. The computed coordinates (X,Y) are transmitted as coordinate information to the arithmetic unit 14 including a computer and the like. The arithmetic unit 14 generates drawing information (e.g., characters, lines, or figures) on the basis of the received coordinate information, and outputs it to the display device 15. For the display device 15, a projector may be used as shown in FIG. 1, or a flat display such as a PDP or a LCD can be used.

Figure 2:
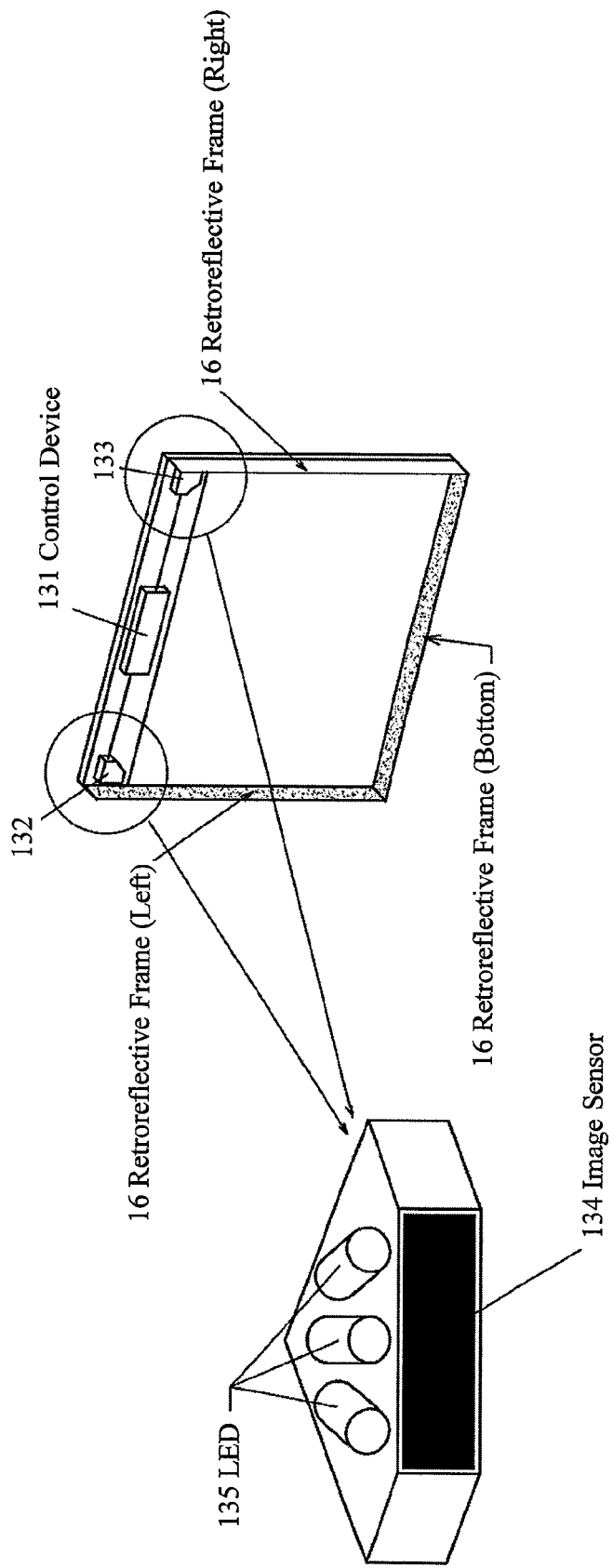
FIG. 2 is a view showing the detailed structures of image sensors that constitute an image-sensor-type interactive whiteboard system (conventional)

FIG. 2 shows the detailed structures of the imaging units 132 and 133, and FIG. 3 shows an example of an imaged screen acquired by the imaging units 132 and 133. As shown in FIG. 2, each of the imaging units 132 and 133 includes an image sensor 134 and a plurality of LEDs 135. In the case of FIG. 2, the LEDs 135 are arranged in a plural number so that the irradiation direction thereof has a wide angle. For the image sensor 134, a CCD sensor, a CMOS sensor, or other image sensors are used, and the image sensor 134 captures an image of the surface of the retroreflective tape through a lens arranged on the light receiving surface thereof. The LEDs 135 emit infrared rays.

The top view of FIG. 3 represents the range of the angle of view of each image sensor 134. The middle view of FIG. 3 shows an example of the screen imaged by the image sensor 134 arranged on the upper right corner of the operation input screen, and the bottom view of FIG. 3 shows an example of the screen imaged by the image sensor 134 arranged on the upper left corner of the operation input screen. As shown in FIG. 3, the imaged screen represents a view in which the indication object 12 (in this case, a pen whose tip is conical in shape) is imaged as a shadow.

It should be noted that in order to improve the reading accuracy of the coordinates, it is necessary to cause the optical axis of the image sensor 134 and the optical axes of the LEDs 135 to coincide with or be close to each other. Patent Literature 1 discloses a method of arranging the LEDs 135 around the image sensor 134, and Patent Literature 2 discloses a method of causing the optical axes of the image sensor 134 and the optical axes of the LEDs 135 to coincide with each other using a half mirror.

[Position Detection Device Used in Embodiment]

FIG. 4 is a view showing the relationship between a position detection device 230 used in the present embodiment and the angle of view for a captured image. Although not shown in FIG. 4, a housing of the position detection device 230 has a projector integrally mounted thereon.

First, the relationship between the basic structure of the position detection device 230 used in the present embodiment and the angle of view for a captured image will be described. The position detection device 230 includes all of a control device 231, an imaging unit (left) 232, and an imaging unit (right) 233 within an independent housing. The function of the control device 231 corresponds to the control device 131 in FIG. 1. The imaging unit (left) 232 and the imaging unit (right) 233 correspond to the imaging unit (left) 132 and the imaging unit (right) 133 in FIG. 1, respectively.

The angle of view of each of the imaging unit (left) 232 and the imaging unit (right) 233 is substantially 180 degrees. Each imaging unit includes an image sensor and LEDs. The irradiation angle of the LEDs is also substantially 180 degrees. The structure of each imaging unit is similar to that shown in FIG. 2 except for the imaging angle and the irradiation angle. The angle of view of each imaging unit is not limited to 180 degrees as long as triangulation is possible. For example, the angle of view may be greater than or equal to 160 degrees.

The middle view of FIG. 4 shows a captured image captured by the imaging unit 233, and the bottom view of FIG. 4 shows a captured image captured by the imaging unit 232. As described above, as imaging units with a wide angle of view are used, the imaging units 232 and 233 can image the entire retroreflective tape located on the left side, the bottom side, and the right side of the operation input screen.

Thus, the imaging units 232 and 233 can be arranged on the inner side of the left and right ends of the operation input screen. This means that there is no need to provide a special position detection device 230 for each size of the operation input screen. That is, the position detection device 230 in accordance with the present embodiment can be commonly used for operation input screens of any size. Thus, FIG. 4 shows an example in which the position detection unit 230 that is significantly shorter than the horizontal length of the operation input screen is used, and is arranged around the center of the top side of the operation input screen.

USE EXAMPLES

The interactive whiteboard system in accordance with the present embodiment is based on the presumption that it is put on a given horizontal plane such as a desk or a floor. However, when a screen is projected onto a desk, which is a projection plane, from a projector (not shown), if the color of the desk is dark, there is a possibility that the projection plane may be difficult to see. Thus, in the present embodiment, a sheet 201 of a white color or a color close to it is used. It should be noted that the sheet 201 is formed with a flexible material that allows the sheet to be wound or flexed when not in use (stored).

Hereinafter, examples of the retroreflective frame-equipped sheet 201 used in the present embodiment will be described.

Example 1

Figure 5:
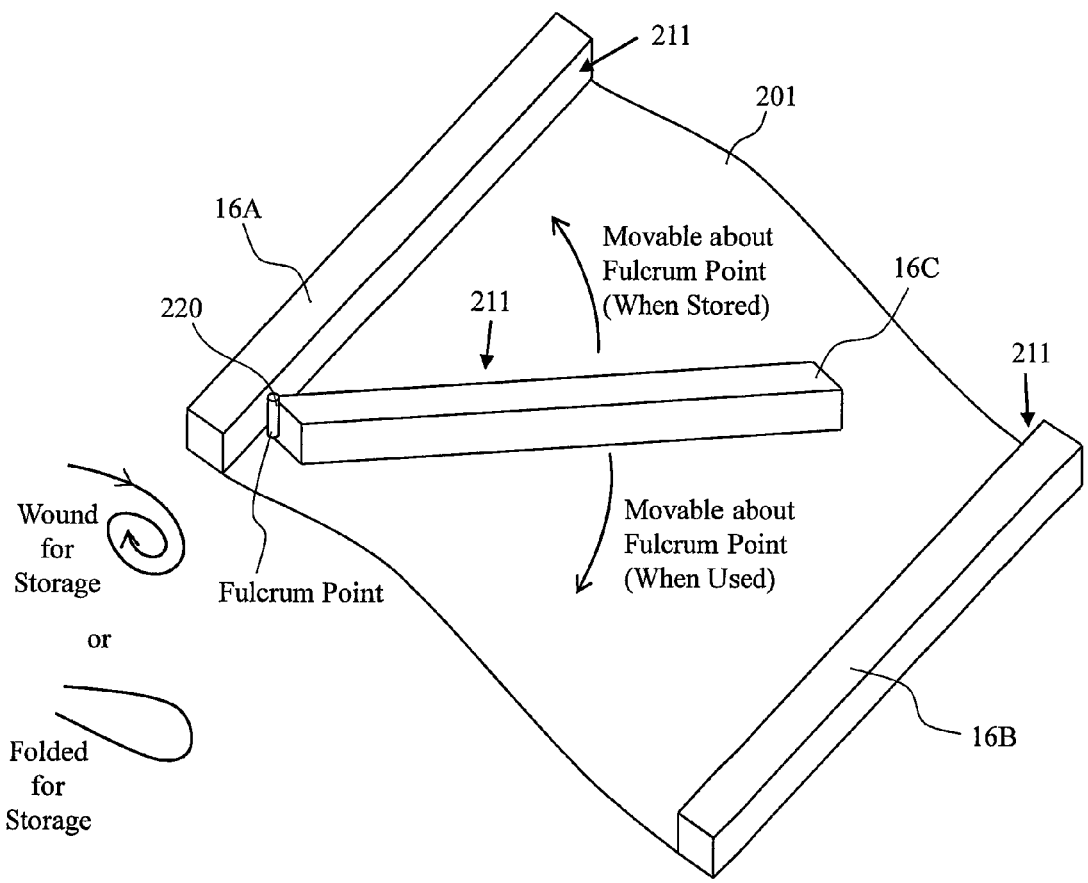
FIG. 5 is a view showing a reflection frame-equipped sheet with a mechanism that allows a retroreflective frame used as the bottom side to be stored on a lateral side.

FIG. 5 shows an exemplary structure of the sheet 201 in accordance with Example 1. The sheet 201 has a rectangular shape such that each of the top and bottom sides is shorter than each of the left and right sides. The sheet 201 in accordance with Example 1 has retroreflective frames 16A and 16B fixed to the left and right sides thereof, respectively. Planes, which surround the operation input screen, of the retroreflective frames 16A and 16B fixed to the sheet 201 have a retroreflective tape 211 attached thereto.

A retroreflective frame 16C used as the bottom side is rotatably attached to an area around the lower end of the retroreflective frame 16A located on the left side via a hinge 220. In addition, one of the fixtures of the hinge 220 is attached to the surface on which the retroreflective tape 211 is attached, and the other fixture is fixed to one of the end faces of the retroreflective frame 16C used as the bottom side. With such a structure, the retroreflective frame 16C used as the bottom side can be opened or closed with respect to the support axis of the hinge 220, along the surface of the sheet 201.

When storing the sheet 201, a user grips the retroreflective frame 16C used as the bottom side, and rotates it counter-clockwise about the support axis of the hinge 220. Then, the user stops the retroreflective frame 16C used as the bottom side at a position parallel with the retroreflective frame 16A used as the left side. At this time, two frames that are the retroreflective frame 16A for the left side and the retroreflective frame 16C for the bottom side are parallel with each other. When the sheet 201 is wound around the two retroreflective frames 16A and 16C or is folded in two, the interactive whiteboard system can be stored in a compact fashion.

When using the sheet 201, the user opens the sheet 201 on the horizontal plane, and moves the retroreflective frame 16C for the bottom side, which has been folded on the retroreflective frame 16A for the left side, clockwise about the hinge 220. When the retroreflective frame 16C for the bottom side is rotated by 90 degrees from the initial position, an end face, which is the attached side, of the retroreflective frame 16C used as the bottom side, abuts the surface of the retroreflective frame 16A for the left side on the hinge 220 side, and thus stops. At this time, another end face (an end face of the movable side) of the end side of the retroreflective frame 16C used as the bottom side abuts a plane of the retroreflective frame 16B on the right side to which the retroreflective tape 211 is attached, and thus is fixed.

There may be provided a small gap between the end face of the end side of the retroreflective frame 16C used as the bottom side and the retroreflective frame 16B of the right side. In such a case, a position at which the retroreflective frame 16C used as the bottom side stops is determined by the abutment between the frames on the hinge side 220. Further, the angle of attachment of the retroreflective frame 16C used as the bottom side is irrelevant to the use conditions. This is because the retroreflective tape 211 can reflect an irradiation ray in the direction of a light source independently of the incident angle of the irradiation ray. It should be noted that a portion of the retroreflective tape 211 with a length that corresponds to at least the gap portion may lie off the end face of the retroreflective frame 16C used as the bottom side. When the gap is smaller, it will be more possible to eliminate or minimize the position undetectable area of the indication object 12.

It should be noted that although the retroreflective frame 16C that is used as the bottom side and is rotationally moved about the hinge 220 is attached to a portion closer to the lower end of the retroreflective frame 16A of the left side in FIG. 5, the position of the attachment is not limited thereto. For example, the retroreflective frame 16C may be attached to a portion closer to the lower end of the retroreflective frame 16B of the right side.

Example 2

Figure 6:
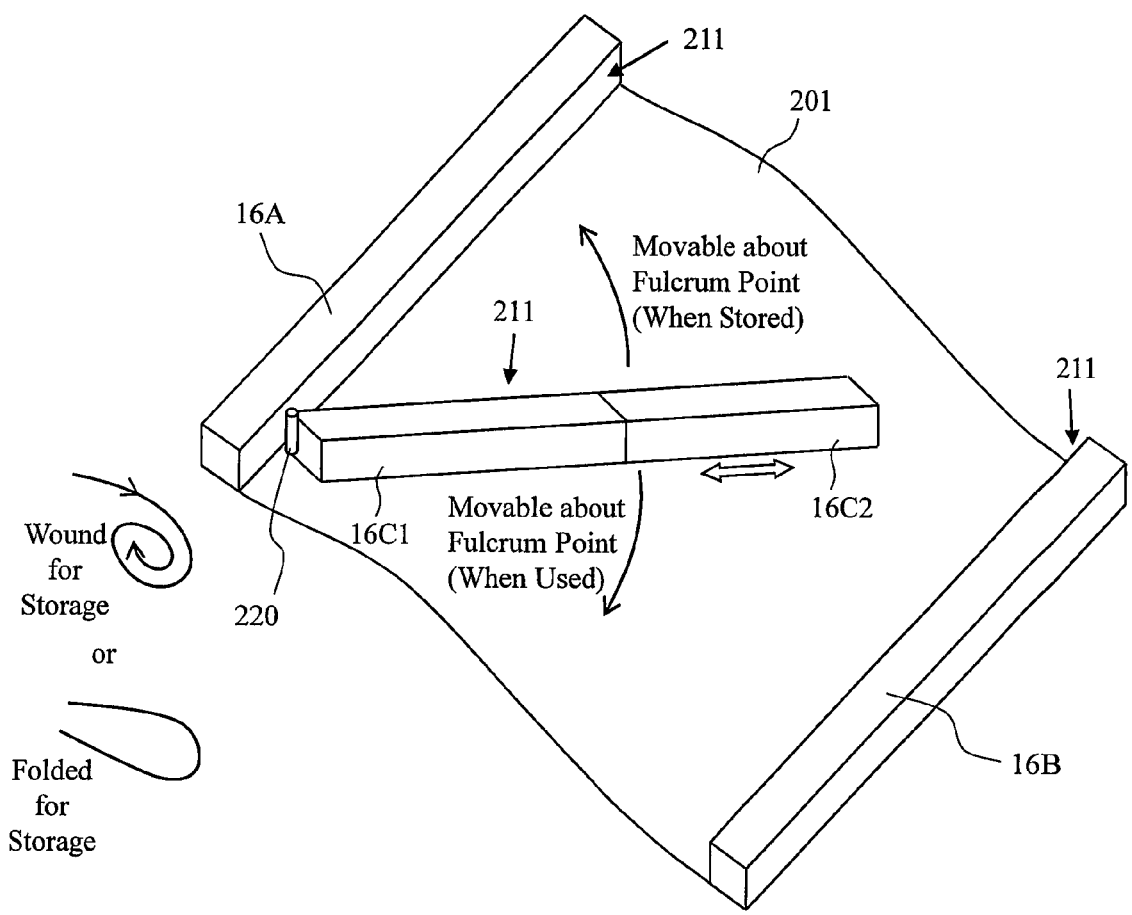
FIG. 6 is a view showing a reflection frame-equipped sheet in which a retroreflective frame for the bottom side, which can be stored, has a telescopic mechanism.

FIG. 6 shows an exemplary structure of the sheet 201 in accordance with Example 2. The basic structure of the sheet 201 in accordance with the present example is similar to the sheet 201 in Example 1. That is, in the present example, the retroreflective frame 16C used as the bottom side is also rotationally moved about the hinge 220.

What is different from Example 1 is that the retroreflective frame 16C that is rotationally moved about the hinge 220 includes two members 16C1 and 16C2, and the member 16C2 located on the end side is slidable with respect to the member 16C1 on the hinge 220 side. The slide structure may be any structure. For example, the member 16C1 is formed in a cylindrical form to allow the member 16C2 to be inserted into and removed from the member 16C1. In any case, the member 16C2 is, when stored, housed in the member 16C1, and is, when used, pulled from the member 16C1.

This structure is advantageous in that the length of the bottom side can be significantly increased than that of the left side. In the case of Example 1, the maximum length of the frame body when stored is determined by the retroreflective frame 16C of the bottom side. In contrast, in the case of Example 2, as the length of the retroreflective frame 16 used as the bottom side is variable, the maximum length of the retroreflective frame 16C when stored can be made less than or equal to the length of the retroreflective frame 16C when in use. In a preferred embodiment, the maximum length of the retroreflective frame 16C used as the bottom side when stored can be limited to be less than or equal to the length of the retroreflective frame 16A for the left side.

It should be noted that the retroreflective frame 16C used as the bottom side need not include two members, and may include three members. In addition, the retroreflective frame 16 used as the bottom side may not be slidable but be collapsible.

Example 3

Figure 7:
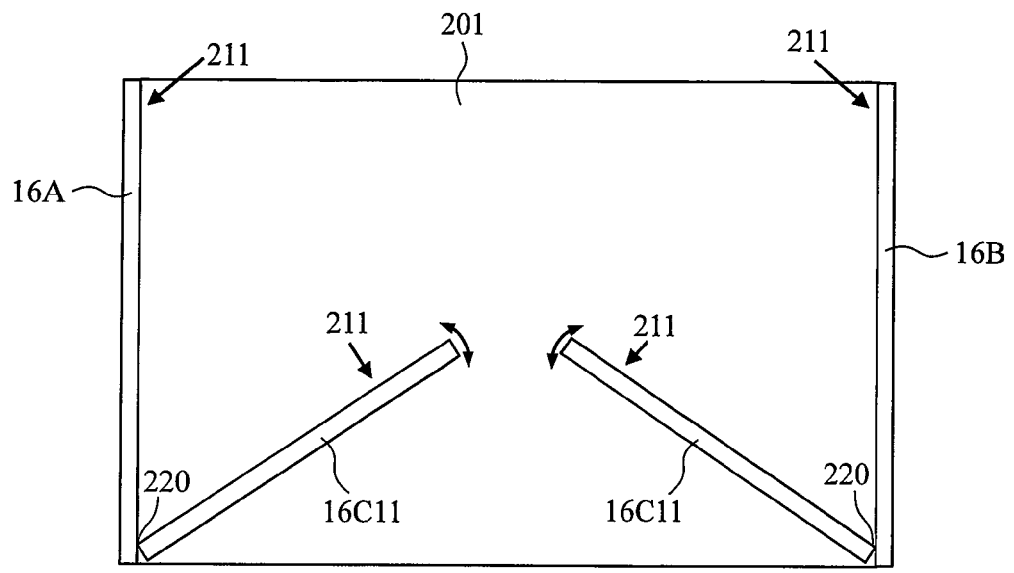
FIG. 7 is a view showing a reflection frame-equipped sheet with a mechanism that allows a retroreflective frame used as the bottom side to rotate in both the left and right directions.

FIG. 7 shows an exemplary structure of the sheet 201 in accordance with Example 3. The basic structure of the sheet 201 in accordance with the present example is also similar to the sheet 201 in Example 1. That is, in the present example, the retroreflective frame 16C used as the bottom side is rotationally moved about the hinge 220.

What is different from Example 1 is that there are two hinges 220. That is, the retroreflective frame 16C used as the bottom side includes two members 16C11, and the respective members 16C11 are rotationally attached to the hinge 220 of the retroreflective frame 16A of the left side and the hinge 220 of the retroreflective frame 16B of the right side. In the case of this structure, the two members 16C11 stop with their ends (movable ends) abutting each other when in use. There may be formed a gap between the ends of the two members 16C11, or an end of the retroreflective tape 211 may protrude beyond the ends of the members 16C11 so as to fill the gap.

In this structure, the maximum length of the frame body when stored can also be made less than or equal to the length of the retroreflective frame 16C of the bottom side when in use. In a preferred embodiment, the maximum length of the frame body when stored can be limited to be less than or equal to the length of the retroreflective frames 16A and 16B of the left and right sides.

Example 4

Figure 8:
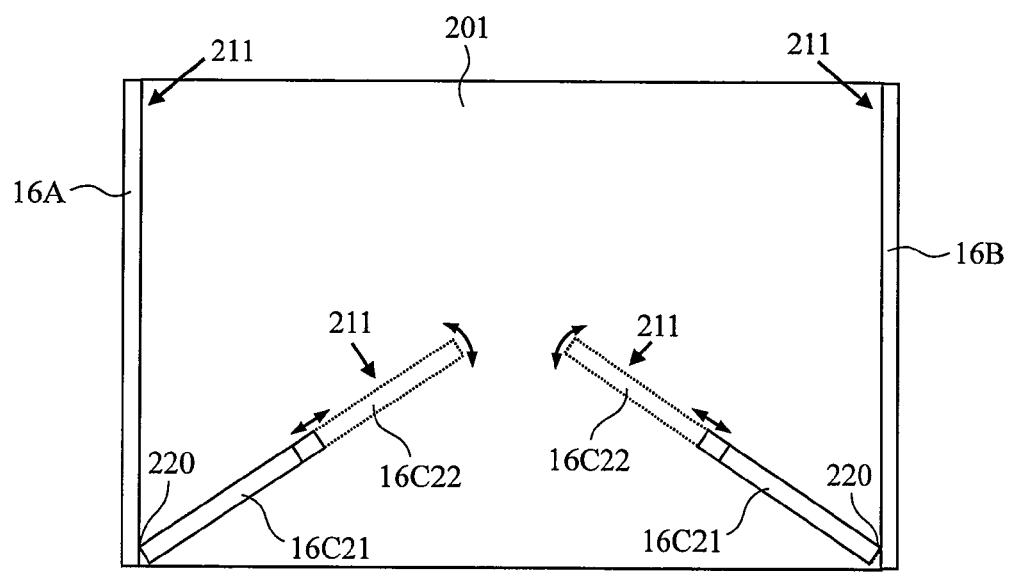
FIG. 8 is a view showing a reflection frame-equipped sheet in which the retroreflective frame used as the bottom side in FIG. 7 has a telescopic mechanism.

FIG. 8 shows an exemplary structure of the sheet 201 in accordance with Example 4. The basic structure of the sheet 201 in accordance with the present example is similar to the sheet 201 in Example 3. That is, in the present example, the retroreflective frame 16C used as the bottom side can rotate about the hinge 220 that is attached to each of the left and right retroreflective frames 16A and 16B of the sheet 201.

What is different from Example 3 is that the retroreflective frame 16C that is rotated about the hinge 220 includes two members 16C21 and 16C22, and the member 16C22 located on the end side is slidable with respect to the member 16C21 on the hinge 220 side. That is, this structure is similar to that of Example 2.

It should be noted that the retroreflective frame 16C used as the bottom side need not include two members, and may include three members. In addition, the retroreflective frame 16C used as the bottom side may not be slidable but be collapsible.

Example 5

Figure 9:
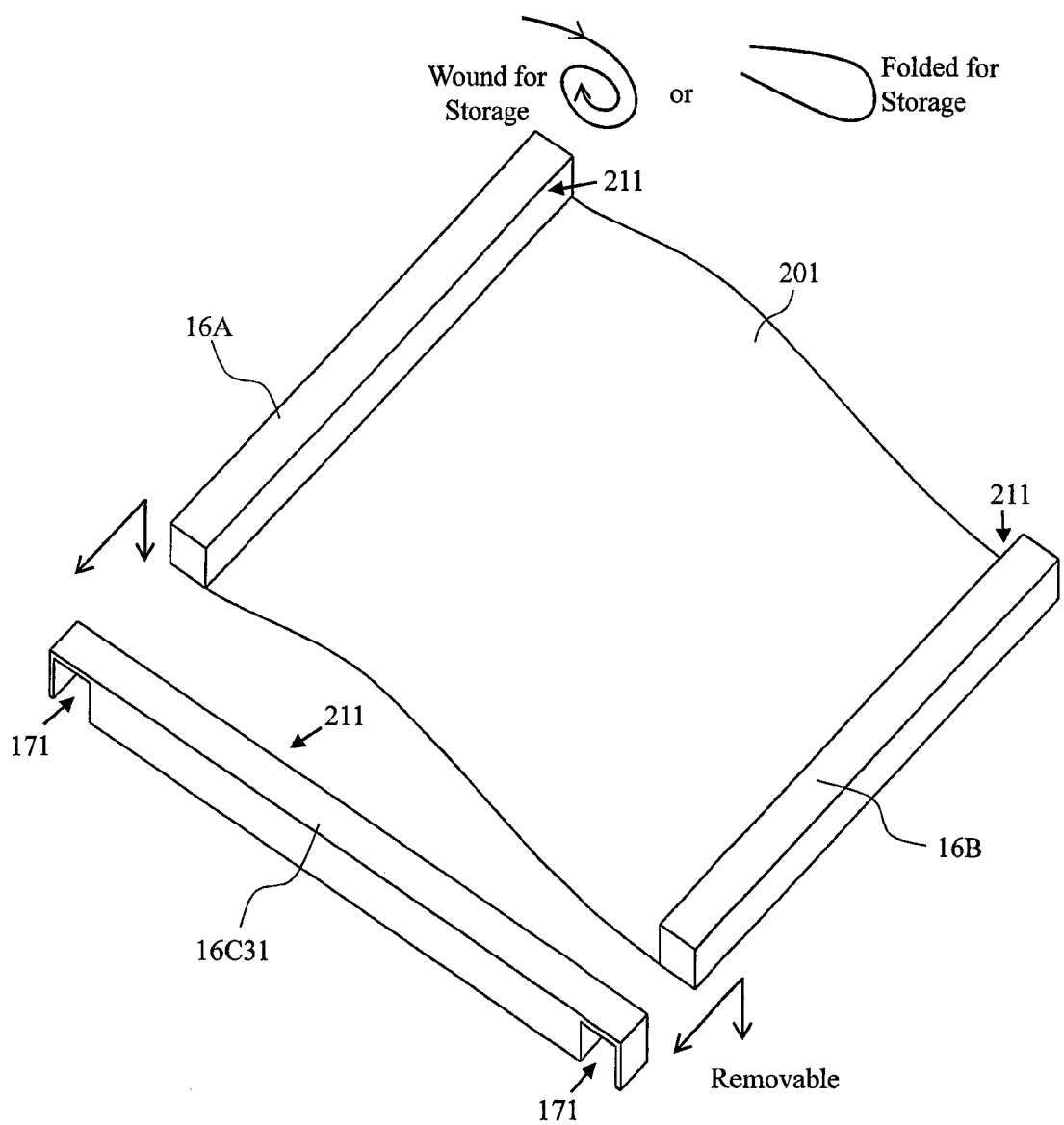
FIG. 9 is a view showing a reflection frame-equipped sheet obtained by fixing a retroreflective frame for the left side and a retroreflective frame for the right side to a sheet, and a retroreflective frame attached to the bottom side thereof.

FIG. 9 shows an exemplary structure of the sheet 201 in accordance with Example 5. As in Example 1, the sheet 201 in accordance with the present example also has retroreflective frames 16 fixed to the left and right sides thereof.

What is different from Example 1 is that in the interactive whiteboard system in the present example, a retroreflective frame 16C used as the bottom side is prepared as an independent component part from the sheet 201.

In the present example, attachment structures 171 are formed on opposite ends of a retroreflective frame 16C31 used as the bottom side. The attachment structures 171 are cutouts whose cross sections are rectangular in shape, for example. The size of the cutouts is large enough for the retroreflective frames 16A and 16B of the left and right sides to be fitted thereinto. Needless to say, a retroreflective tape 211 is attached to one of the side faces, which corresponds to a long side, of each retroreflective frame.

When storing the sheet 201, a user takes the retroreflective frame 16C31 used as the bottom side off the sheet 201. Then, the user winds the sheet 201 around the retroreflective frame 16A or 16B of the left or right side, or folds the sheet 201 in two, thereby storing the whiteboard system in a compact fashion. At this time, the retroreflective frame 16C31 used as the bottom side may be overlaid above the left or right retroreflective frame 16A or 16B so that the sheet 201 is wound around them.

When using the sheet 201, the user opens the sheet 201 on the horizontal plane, and attaches the attachment structures 171 of the retroreflective frame 16C31 of bottom side, which is the separate component part, such that the attachment structures 171 are fitted over the retroreflective frame 16A of the left side and the retroreflective frame 16B of the right side, respectively.

It should be noted that attachment of the attachment structures 171 to the two, left and right retroreflective frames 16A and 16B is not limited to mechanical fitting and may be attachment with a fastening screw mechanism. In addition, as the sheet 201 is put on a horizontal plane such as a desk, the retroreflective frame 16C31 that constitutes the bottom side needs not necessarily be attached to the two, left and right retroreflective frames 16A and 16B, and may be merely arranged along the bottom side of the sheet 201.

Example 6

Figure 10:
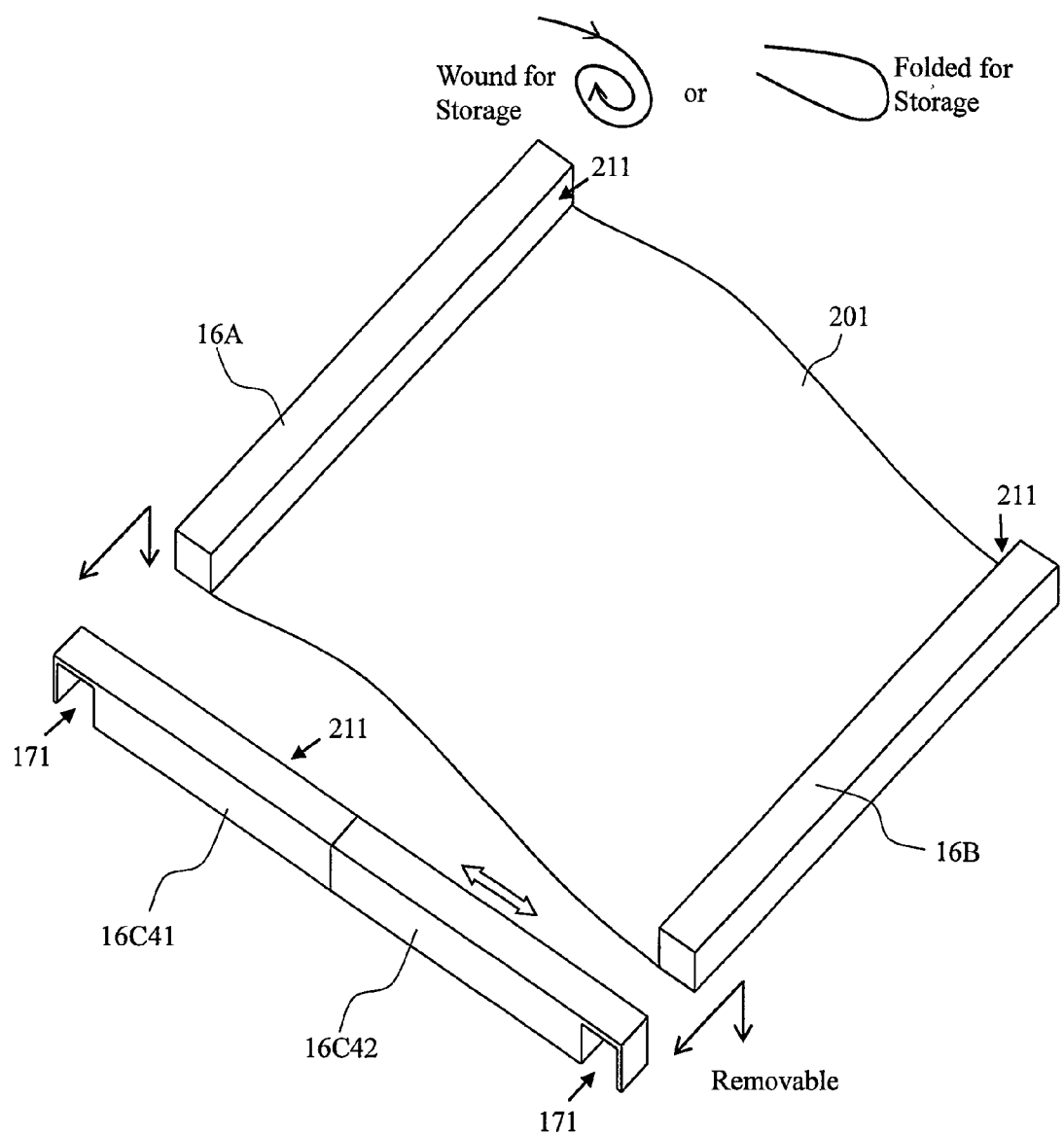
FIG. 10 is a view illustrating a case where the retroreflective frame used as the bottom side in FIG. 9 has a telescopic mechanism.

FIG. 10 shows an exemplary structure of the sheet 201 in accordance with Example 6. The sheet 201 in accordance with the present example also has a retroreflective frame 16C used as the bottom side, which is formed as a separate component from the sheet 201, as in Example 5.

What is different from Example 5 is that the retroreflective frame used as the bottom side includes two members 16C41 and 16C42, and one of the members 16C41 is slidable with respect to the other member 16C42. The slide structure may be any structure. For example, the member 16C41 is formed in a cylindrical form to allow the member 16C42 to be inserted into and removed from the member 16C41. In any case, the member 16C42 is, when stored, housed in the member 16C41, and is, when used, pulled from the member 16C41.

This structure is advantageous in that the length of the bottom side can be significantly increased than the left side. In the case of Example 5, the maximum length of the frame body when stored is determined by the length of the retroreflective frame 16C of the bottom side. Meanwhile, in the case of Example 6, as the length of the retroreflective frame 16C for the bottom side is variable, the maximum length of the frame when stored can be made less than or equal to the length of the retroreflective frame 16C of the bottom side when in use. In a preferred embodiment, the maximum length of the retroreflective frame 16C used as the bottom side when stored can be limited to be less than or equal to the length of the retroreflective frame 16A used as the left side.

It should be noted that the retroreflective frame used as the bottom side need not include two members, and may include three members. In addition, the retroreflective frame used as the bottom side may not be slidable but be collapsible.

Example 7

Figure 11:
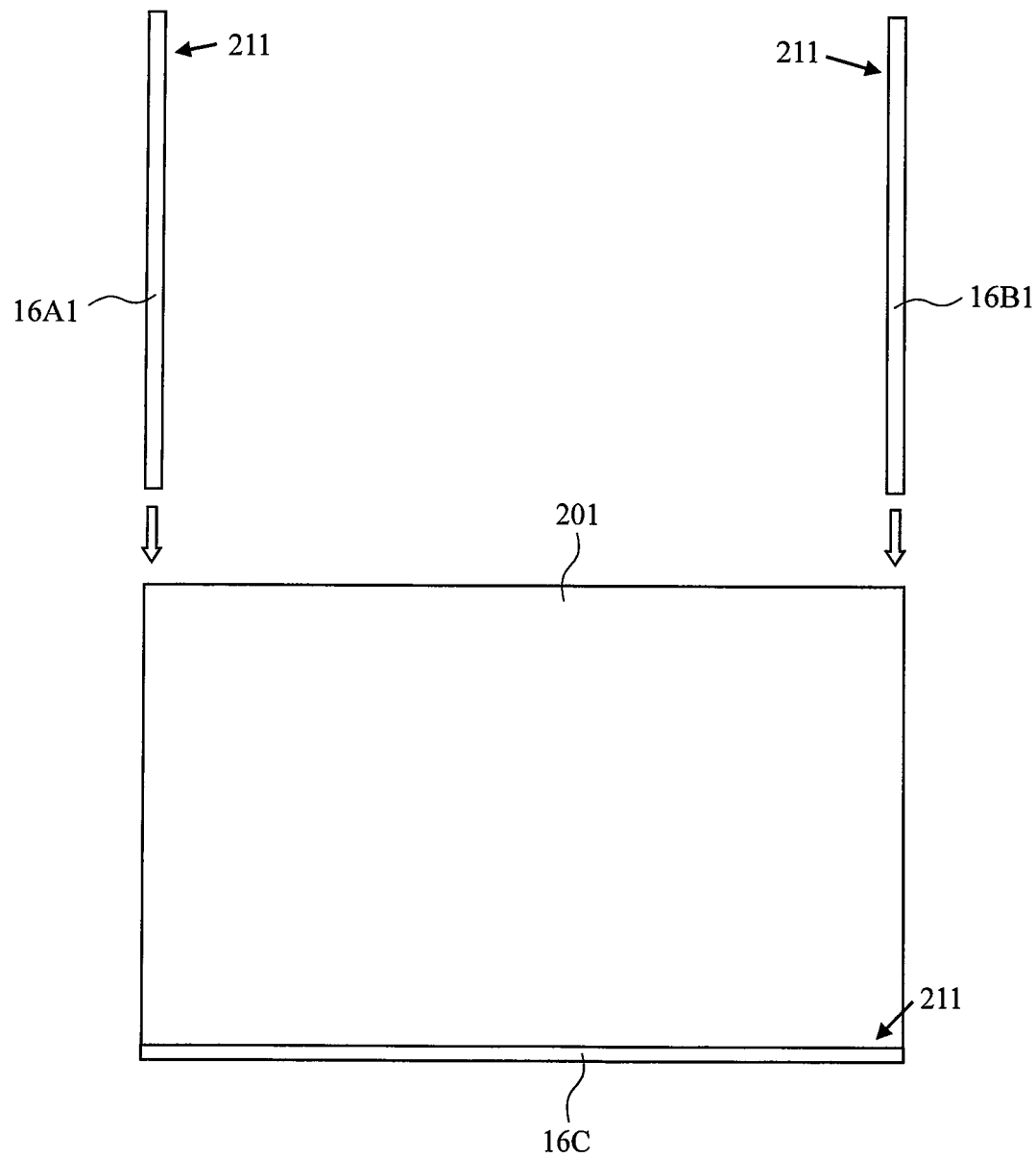
FIG. 11 is a view showing a reflection frame-equipped sheet obtained by fixing a retroreflective frame used as the bottom side to a sheet, and retroreflective frames attached to the opposite sides thereof.

FIG. 11 shows an exemplary structure of the sheet 201 in accordance with Example 7. In the present example, the retroreflective frame 16C is fixed only to the bottom side of the sheet 201, and retroreflective frames 16A1 and 16B1 of the left and right sides are configured as independent component parts.

In this case, each of the retroreflective frame 16A1 for the left side and the retroreflective frame 16B1 for the right side is removably attached to the retroreflective frame 16C fixed to the bottom side of the sheet 201. Alternatively, the retroreflective frame 16A1 for the left side and the retroreflective frame 16B1 for the right side are arranged along the left and right sides of the sheet 201, respectively. As the sheet 201 is put on a horizontal plane of a desk, it need not necessarily be attached to the retroreflective frame 16C of the bottom side. For example, the retroreflective frames 16A1 and 16B1 may just be arranged along the right and left sides of the sheet 201.

When storing the sheet 201, a user takes the retroreflective frame 16A1 for the left side and the retroreflective frame 16B1 for the right side off the sheet 201. Then, the user winds the sheet 201 around the retroreflective frame 16C fixed to the bottom side, which is a long side of the sheet 201, or folds the sheet 201 in two, thereby storing the whiteboard system in a compact fashion. At this time, the left and right retroreflective frames 16A1 and 16B1 may also be overlaid above the retroreflective frame 16C of the bottom side so that the sheet 201 is wound around them.

When using the sheet 201, the user opens the sheet 201 on the horizontal plane, and arranges the two, left and right retroreflective frames 16A1 and 16B1, which are the separate component parts, along the left and right sides of the sheet 201. It should be noted that the two, left and right retroreflective frames 16A1 and 16B1 may be attached to the retroreflective frame 16C of the bottom side either through mechanical fitting or using a fastening screw mechanism.

Example 8

Figure 12:
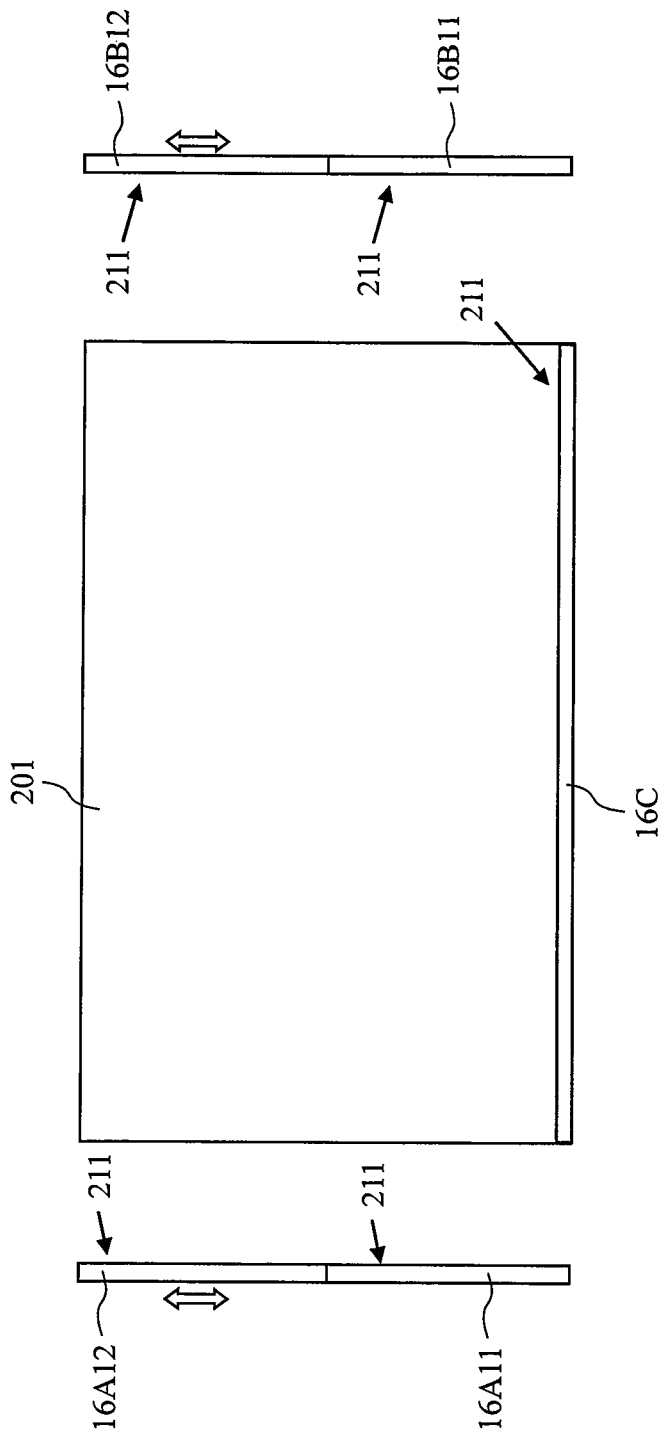
FIG. 12 is a view illustrating a case where each of the retroreflective frame used as the left side and the retroreflective frame used as the right side in FIG. 11 has a telescopic mechanism.

FIG. 12 shows an exemplary structure of the sheet 201 in accordance with Example 8. As in Example 7, the sheet 201 in accordance with the present example also has a retroreflective frame 16C used as the bottom side, which is fixed to the sheet 201, and retroreflective frames for the left and right sides are configured as the separate component parts.

What is different from Example 7 is that each of the retroreflective frames for the left and right sides includes two members 16A11 and 16A12, and one of the members 16A12 is slidable with respect to the other member 16A11. The slide structure may be any structure. For example, the member 16A11 is formed in a cylindrical form to allow the member 16A12 to be inserted into and removed from the member 16C11. In any case, the member 16C12 is, when stored, housed in the member 16C11, and is, when used, pulled from the member 16C11.

It should be noted that the retroreflective frames used for the left and right sides need not include two members, and may include three members. In addition, the retroreflective frame used as the bottom side may not be slidable but be collapsible.

Example 9

Figure 13:
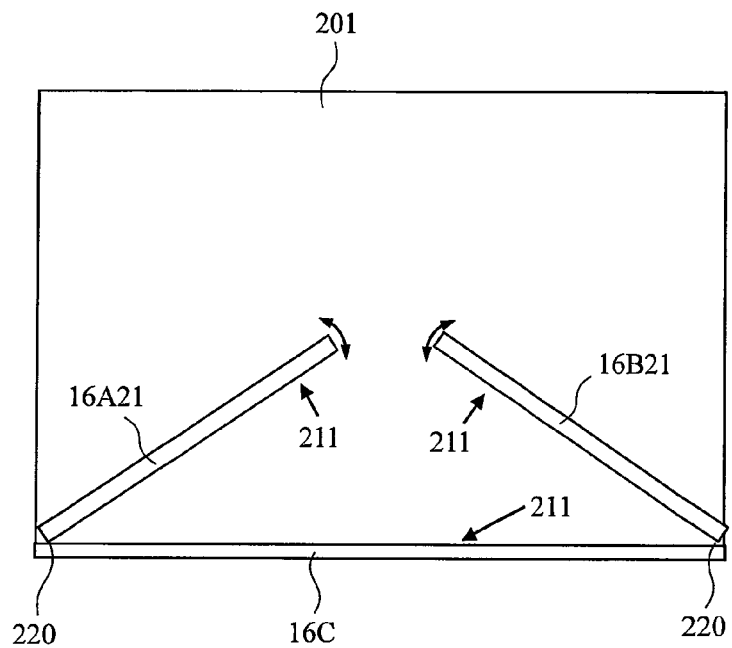
FIG. 13 is a view showing a reflection frame-equipped sheet obtained by rotatably attaching retroreflective frames for the left and right sides to a retroreflective frame that is fixed to the bottom side of a sheet.

FIG. 13 is a view showing an exemplary structure of the sheet 201 in accordance with Example 9. As in Example 7, the sheet 201 in accordance with the present example also has a retroreflective frame 16C, which is used as the bottom side, fixed to the sheet 201.

What is different from Example 7 is that retroreflective frames 16A21 and 16B21 for the left and right sides are rotatably attached to the opposite ends of the retroreflective frame 16C for the bottom side by hinges 220.

When storing the sheet 201, a user grips the retroreflective frame 16A21 for the left side, and rotates it clockwise about the hinge 220. In addition, the user grips the retroreflective frame 16B21 for the right side, and rotates it counterclockwise about the hinge 220. Then, the user stops the two, left and right retroreflective frames 16A21 and 16B21 at positions parallel with the bottom side of the sheet 201. At this time, the two, left and right retroreflective frames 16A21 and 16B21 are parallel with the retroreflective frame 16C of the bottom side. When the two retroreflective frames 16A21 and 16B21 are wound around the sheet 201 or folded in two, the interactive whiteboard system can be stored in a compact fashion.

When using the sheet 201, the user opens the sheet 201 on the horizontal plane, rotates the retroreflective frame 16A21 for the left side counterclockwise, and rotates the retroreflective frame 16B21 for the right side clockwise. The rotation of each of retroreflective frames 16A21 and 16B21 for the left and right sides stops at a position of 90 degrees from the initial position.

In FIG. 13, each of the retroreflective frames 16A21 and 16B21 for the left and right sides is configured as a single member, but may also have a slide structure of two members. Needless to say, the slide structure may be any structure. In addition, the retroreflective frames for the left and right sides need not include two members, and may include three members. In addition, the retroreflective frame used as the bottom side may not be slidable but be collapsible.

Example 10

Figure 14:
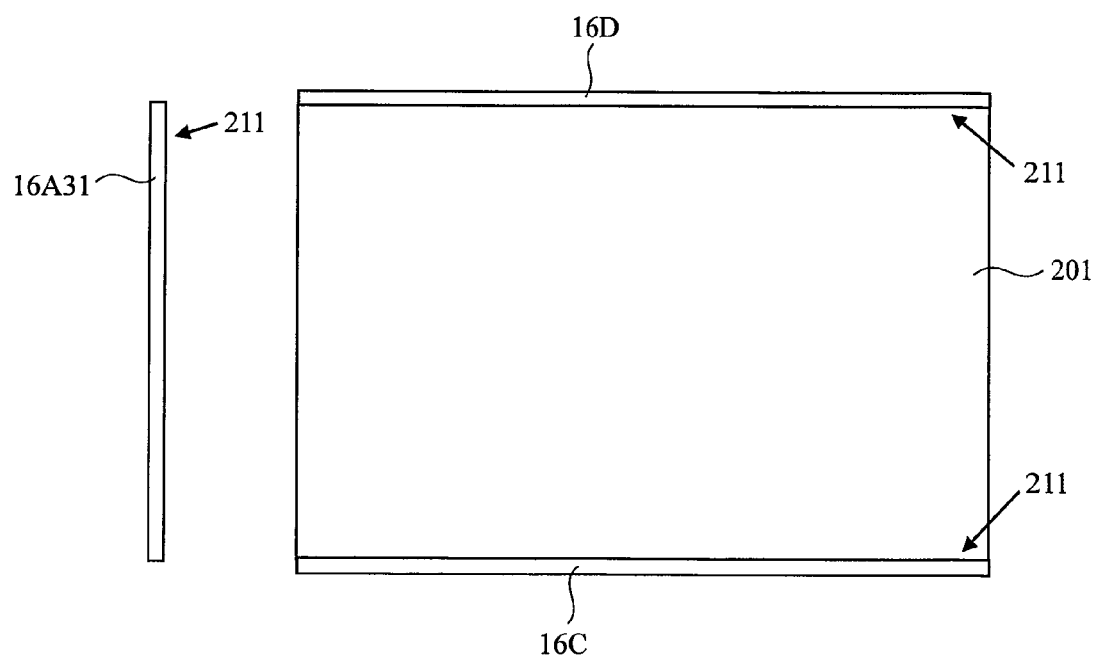
FIG. 14 is a view showing a reflection frame-equipped sheet obtained by fixing retroreflective frames for the top and bottom sides to a sheet, and a retroreflective frame attached to the left side thereof.

FIG. 14 shows an exemplary structure of the sheet 201 in accordance with Example 9. In Examples 1 to 6 above, cases where a retroreflective frame is fixed to each of the left and right sides of the sheet 201 have been described.

However, as shown in the present example, it is also possible to provide a structure in which retroreflective frames 16C and 16D are fixed to the top and bottom sides of the sheet 201, and a retroreflective frame 16A31 as a separate member is attached to or arranged on the left or right side.

Example 11

Figure 15:
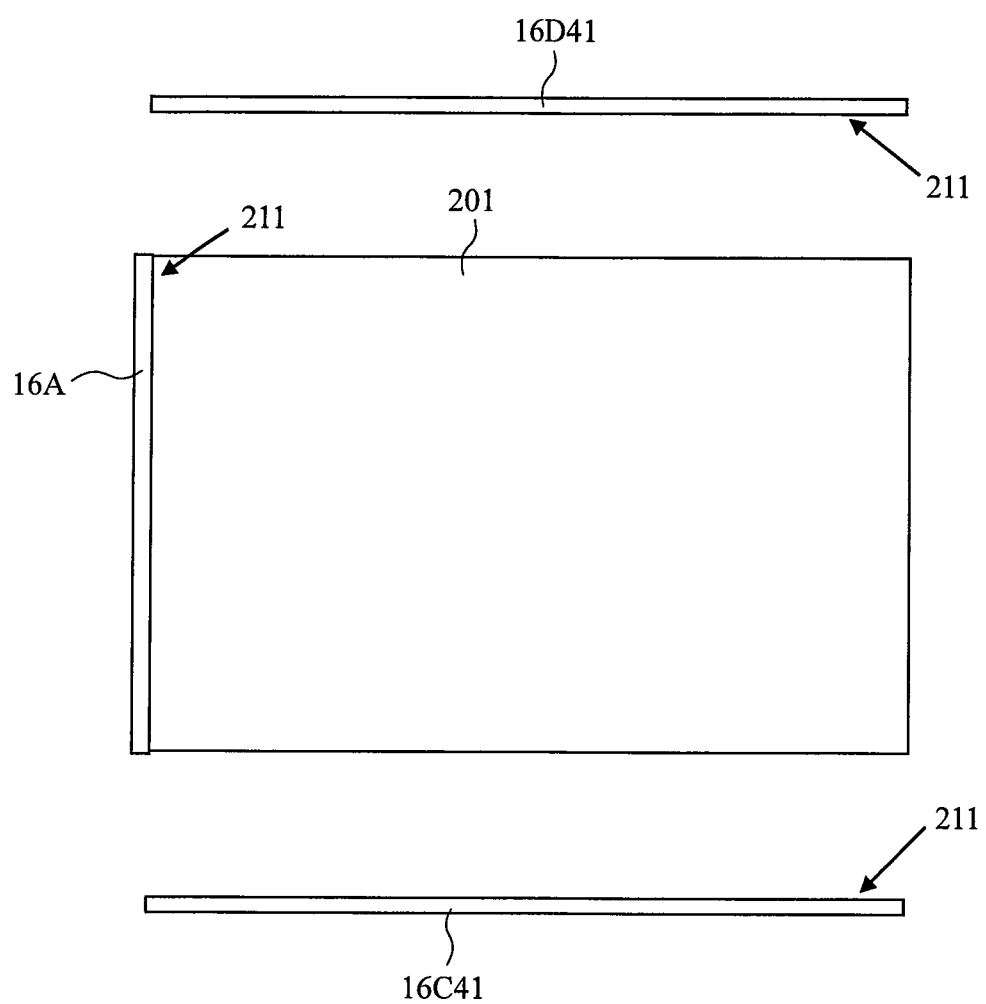
FIG. 15 is a view showing a reflection frame-equipped sheet obtained by fixing a retroreflective frame for the left side to a sheet, and retroreflective frames attached to the top and bottom sides thereof.

FIG. 15 shows an exemplary structure of the sheet 201 in accordance with Example 10. In Examples 7 to 8 above, cases where a retroreflective frame is fixed to the bottom side of the sheet 201 have been described.

However, as shown in the present example, it is also possible to provide a structure in which a retroreflective frame 16A is fixed only to the left side of the sheet 201, and retroreflective frames 16C41 and 16D41 as the separate members are attached to or arranged on the top and bottom sides.

Example 12

Figure 16:
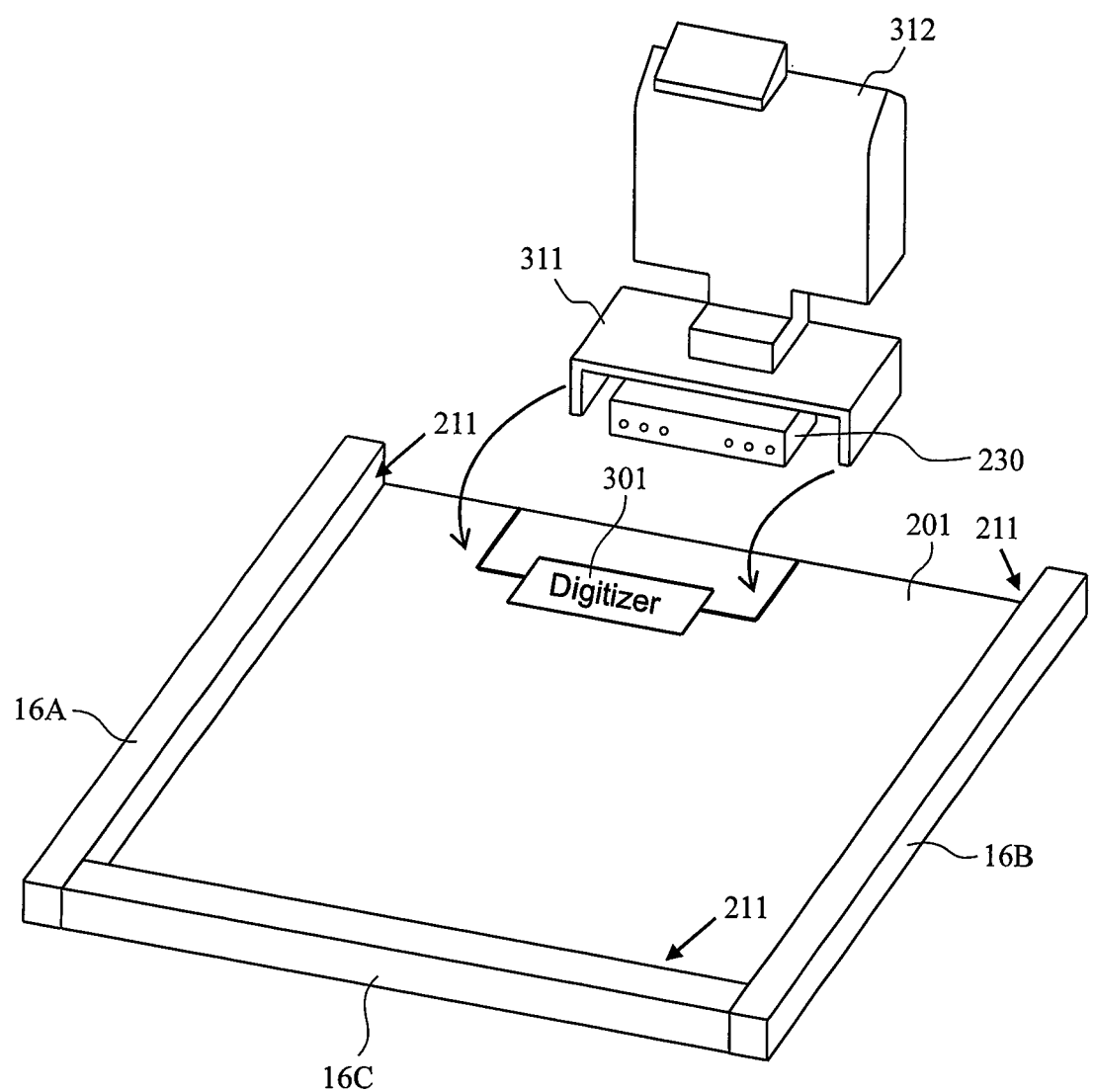
FIG. 16 is a view showing a position detection device for a reflection frame-equipped sheet, and a retroreflective frame-equipped sheet whose seat surface has printed thereon a target installation position of a projector.

FIG. 16 shows an exemplary structure of the sheet 201 in accordance with Example 11. In the previous embodiment, cases have been described where a retroreflective frame(s) is/are fixed to one side or opposite two sides of the sheet 201, and a retroreflective frame(s) as an independent component part(s) is/are attached to another side or the other two sides.

In the present example, the structure of a sheet surface that is common to each example will be described. In the present example, a projection plane of the sheet 201 (specifically, around the middle of the top side of the operation input screen) has printed thereon a mark 301 that indicates the installation position of a projector stand 311 having integrally fixed thereto the position detection device 230 and the projector 312.

As described above, as the sheet surface has printed thereon the mark 301 indicating the installation position, it is possible to easily position the position detection device 230 integrated with the projector.

REFERENCE SIGNS LIST

10 Interactive whiteboard system
11 Coordinate input device
12 Indication object
13 Position detection device
14 Arithmetic device
15 Display device
16 Retroreflective frame
131 Control device
132 Imaging unit
133 Imaging unit
134 Image sensor
135 LED
201 Sheet
161 Member
162 Member
165 Member
166 Member
167 Member
170 Retroreflective frame
171 Attachment mechanism
172 Member
175 Member
176 Member
180 Retroreflective frame
181 Member
182 Member
191 Retroreflective frame
193 Retroreflective frame
301 Mark
311 Projector stand
312 Projector

The invention claimed is:

1. A reflection frame-equipped sheet comprising:
a flexible sheet on which display images are projected from a projector;
a first retroreflective frame fixed to a first side of the flexible sheet and a second retroreflective frame fixed to a second side of the flexible sheet, the first side and the second side are opposite sides of the flexible sheet;
a third retroreflective frame that is detachably attached to a third side of the flexible sheet,
wherein the third side is the bottom side of the flexible sheet and is between the first side and the second side,
wherein the third retroreflective frame includes a plurality of slideable members, and
wherein the flexible sheet is foldable upon itself for storage.

2. The reflection frame-equipped sheet according to claim 1, wherein a surface of the sheet has printed thereon a mark indicating installation positions of a position detection device and a projector.

3. The reflection frame-equipped sheet according to claim 1, wherein the flexible sheet is operable for use when a planar surface of the flexible sheet is parallel to a horizontal surface such as a table.

4. The reflection frame-equipped sheet according to claim 1, wherein the flexible sheet is positioned on a horizontal surface when in use.

5. The reflection frame-equipped sheet according to claim 1, wherein
   the third retroreflective frame includes at least one notch disposed in a slideable member of the plurality of slideable members,
   wherein the at least one notch is configured to engage with one of the first retroreflective frame and the second retroreflective frame.

6. The reflection frame-equipped sheet according to claim 5, wherein
   the engagement of the at least one notch with one of the first retroreflective frame and the second retroreflective frame is a mechanical fitting.

7. The reflection frame-equipped sheet according to claim 5, wherein
   a rivet is used to secure the engagement of the at least one notch with one of the first retroreflective frame and the second retroreflective frame.

8. The reflection frame-equipped sheet according to claim 6, wherein
   the mechanical fitting is secured with a rivet.

* * * * *